United States Patent
Cheong et al.

(10) Patent No.: US 6,477,154 B1
(45) Date of Patent: Nov. 5, 2002

(54) MICROCELLULAR MOBILE COMMUNICATION SYSTEM

(75) Inventors: Jong Min Cheong, Seoul (KR); Tae Gue Kim, Seoul (KR); Sang Hoon Seo, Seoul (KR); Jae Sung Lim, Seoul (KR); Sun Park, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/138,470

(22) Filed: Aug. 14, 1998

(30) Foreign Application Priority Data

Aug. 14, 1997 (KR) ............................................. 97-38788

(51) Int. Cl.[7] .......................... H04B 7/216; H04J 3/16; H04J 14/00; H04Q 7/00; H04Q 7/20

(52) U.S. Cl. ...................... 370/328; 370/467; 359/109; 359/115; 359/118; 375/130; 375/140; 375/257; 455/444; 455/436; 455/439

(58) Field of Search ................................. 370/320, 328, 370/331, 334, 335, 342, 467; 359/109, 115, 118, 135–136; 375/130, 140, 257; 455/436, 439, 442, 444, 450–452

(56) References Cited

U.S. PATENT DOCUMENTS 5,280,472 A * 1/1994 Gilhousen et al. ............. 370/18
5,303,287 A * 4/1994 Laborde ...................... 379/59
5,400,391 A * 3/1995 Emura et al. ................. 379/59
5,424,864 A * 6/1995 Emura ........................ 359/172
5,761,619 A * 6/1998 Danne et al. ............... 455/422
5,969,837 A * 10/1999 Farber et al. ............... 359/132

* cited by examiner

Primary Examiner—Alpus H. Hsu
Assistant Examiner—Toan Nguyen
(74) Attorney, Agent, or Firm—Sheridan Ross P.C.

(57) ABSTRACT

A microcelluar mobile communication system which performs various functions such as a centralized management of resources, a capacity increase, a Base Station Transceiver System(BTS) miniaturization, a synchronization between micro base stations, a dynamic resource management, a softer handover between cells, a grouping and ungrouping of base stations in accordance with a traffic distribution. The microcelluar mobile communication system may increase the subscriber capacity, provide the high reliable service, extend the battery life of a personal station inducing low power communication and assure the radio channel capacity so that the radio multimedia service may be accomplished in the future, by maximizing the utility efficiency of radio frequency resource through cell miniaturization. The microcelluar mobile communication system may be installed efficiently to an indoor, a building underground, an underground tunnel as well as an outdoor, and may compose the single cell also in the indoor.

21 Claims, 8 Drawing Sheets

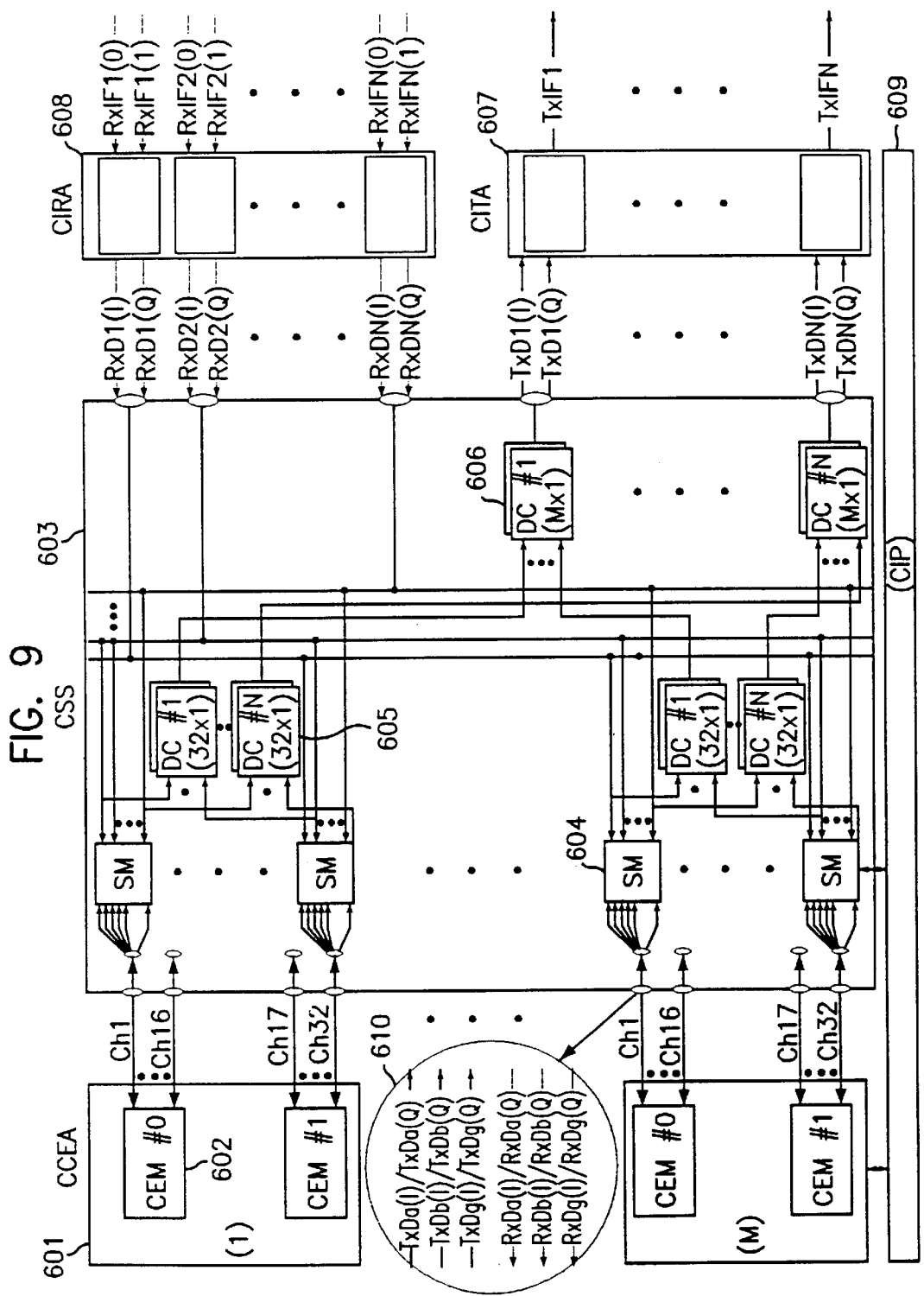

MICROCELLULAR MOBILE COMMUNICATION SYSTEM

BACKGROUND OF THE INVENTION

The present invention relates to a microcellular mobile communication system using a Code Division Multiple Access (CDMA) scheme, more particularly the microcelluar mobile communication system that provides subscribers with the high-speed mobile communication service more stably by providing the mobile communication service based on a microcell of a radius of several hundred meters, and improves frequency utility efficiency.

The microcellular mobile communication system may extend the life span of a mobile station because a cell radius is small, and is interesting as a structure to which a variety of services (i.e. data and image) are applicable. This microcellular mobile communication system needs a large number of base stations, which will increase the cost of initial facility investment and maintenance. A Base Station Transceiver System (BTS), in the conventional CDMA cellular mobile communication system, is connected with other equipments through E1/T1 or high-speed digital subscriber lines.

Accordingly, the BTS comprises a digital unit including the CDMA Channel Element Assembly (CCEA) for modulating and demodulating the signal of the CDMA scheme, a control processor including a Radio Frequency (RF) signal processing unit, a Base Station Controller (BSC) interface and an operation management interface, and the Global Positioning System (GPS) for synchronization between base stations and so on.

Such a BTS is not appropriate for a mobile communication system composed of a microcell type when taking weight or volume into account. Of course, there is an outdoor BTS of a small capacity structure, but it is difficult to install the BTS appropriate for various RF environments of metropolitan, in which it is needed, every several hundred meters and to extend capacity.

To solve the problems and the shadow areas, an antenna technique using the optical or the separate antenna has been used. However this technique, which transmits only an RF signal from the conventional BTS to a remote antenna through a coaxial cable or an optical fiber, is not appropriate for the mobile communication system of a large scale of microcell type in the future due to a synchronous problem between the conventional BTS and its antenna. That is, these can not perform various functions, needed for the microcell environment, which extend new cells, in order to increase the subscriber capacity, manage resources while maintaining the conventional service, or process a softer handover in more than three cells.

SUMMARY OF THE INVENTION

Accordingly, an object of the present invention is to provide a microcelluar mobile communication system that can perform various functions such as a centralized management of resources, a capacity increase, a Base Station Transceiver System (BTS) miniaturization, a synchronization between micro base stations, a dynamic resource management, a softer handover between cells, a grouping and ungrouping of base stations in accordance with a traffic distribution.

To achieve the above object, the present invention comprises a GPS receiver for generating a timing information and a reference clock signal to maintain synchronization of a system and a network; a micro base station controller for interfacing with a base station controller, performing a spreading modulation and demodulation, combining signals through a switching operation for dynamic channel allocation between cells and softer handover process, and up-converting the combined signal into at intermediate frequency so that said micro base station controller outputs the up-converted signal with a cable frequency if said micro base station controller transmits a signal to a plurality of micro base stations, and conversely down-converting a received cable frequency into the intermediate frequency so that said micro base station controller transmits a packetized message to said base station controller if said micro base station controller receives a signal from said plurality of micro base stations; a transferring means connected between said GPS receiver and said micro base station controller, for transferring the cable frequency signal in respond to a control signal; and said plurality of micro base stations for transmitting and receiving the cable frequency signal to and from said micro base station controller, respectively, through said transferring means, and for transmitting and receiving a radio frequency signal to and from a mobile station, respectively.

The present invention is divided into a digital hardware and an RF transceiver, the digital hardware and the RF transceiver are connected through optical fibers or hybrid fiber coaxial networks based on the Subcarrier Multiplexing (SCM) technique. The SCM means a transmission scheme that carries information on different frequencies from each other electrically in the transmission stage, combines the carried information, electrical-to-optical converts and transmits it through optical fibers, and optical-to-electrical converts and then recovers to an original signal through a band pass filtering.

The microcellular mobile communication of the present invention comprises a micro Base Station Controller (mBSC), which may manage resources in the center and supports a plurality of microcells, a Hybrid Fiber Radio (HFR) network based on the SCM technique and a plurality of micro Base Stations (mBSs) connected to the mBSC. Here the HFR, as a hybrid technique of the broad band nature of wire (optical fiber) and the mobility of radio, means that it transmits a Radio Frequency (RF) or an Intermediate Frequency (IF) through the optical fiber.

The micro Base Station (mBS) proposed in this invention, is installed within each microcell as an equipment only having an HFR network module, a simple control signal processor, a frequency up/down converter, an amplifier, a filter, a power source and so on. The mBSs are connected with the MBSC through the optical fiber or the hybrid fiber coaxial network. The MBSC performing the centralized control of the mBS comprises the digital hardware of the conventional Base Station Transceiver System (BTS), a Code Stream Switch (CSS) being capable of a dynamic resource allocation and the softer handover, an HFR network management module, the HFR network interface module and so on.

In addition, the mBSC performs the centralized-management of the mBS through the CSS, and minimizes an initial investment cost for constructing a microcell mobile communication system by allocating dynamically an inter-cell communication channel, and allows a cell design satisfying an optimum capacity. That is, the present invention as compared with the distributed control network of the conventional base station, permits the centralized control network, the dynamic channel allocation, and the base station grouping operation, and may process a handover between base stations with the softer handover.

Referring to a forward link, the mBSC converts a signal to be transmitted to each mBS into a cable frequency signal and then transmits the cable frequency signal through the HFR network. The mBS receives the cable frequency signal and then transmits the RF through an antenna after up-converting the cable frequency signal into the RF for personal communications system. On the other hand, the RF received from a mobile station is received in the mBS and then transmitted to the mBSC through a reverse link.

In particular, the present invention installs a GPS receiver in the mBSC without installing additionally the GPS receiver in the mBS, transmits a reference clock signal from the GPS receiver through the HFR network, and maintains the synchronization between mBSs. Thus the mBS installation cost is reduced, and the cell design may be applied to an indoor, a tunnel and so on that it is difficult for a GPS antenna to be installed. The communication system and network in accordance with the present invention interface with other communication network and are designed so that various radio communication services may be accommodated.

BRIEF DESCRIPTION OF THE DRAWINGS

This invention can be more fully understood from the following detailed description when taken in conjunction with the accompanying drawings, in which:

FIG. 9 is a block diagram of an MBSC according to the present invention.

DETAILED DESCRIPTION OF THE INVENTION

Preferred embodiments of the present invention will now be described in detail, with reference to the accompanying drawings.

Figure 1:
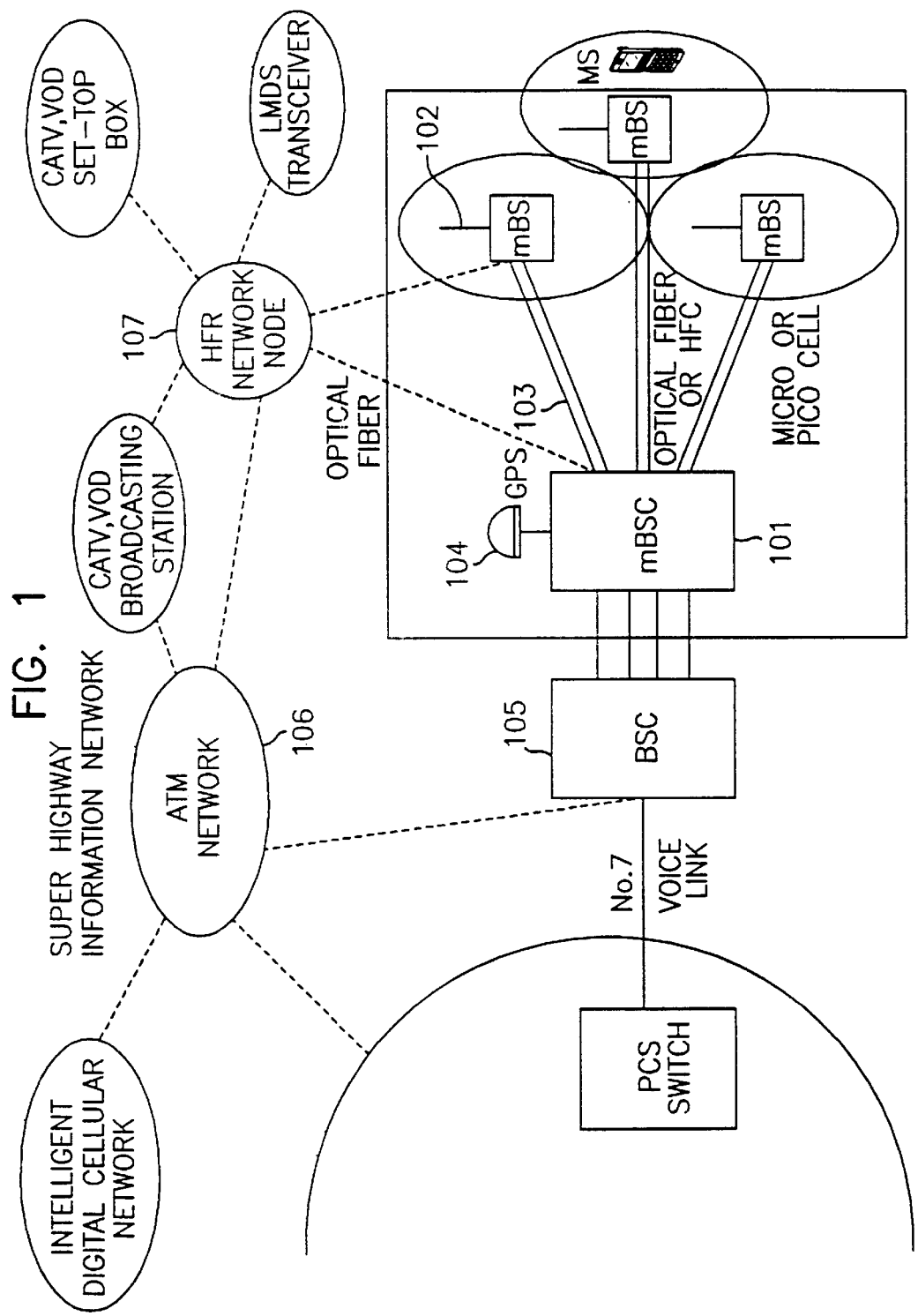
FIG. 1 shows schematically an overall construction of a microcellular mobile system for a personal communication according to the present invention.

FIG. 1 shows schematically an overall construction of a microcellular mobile system for a personal communication according to the present invention.

In the present invention the micro Base Station (mBS) 102 comprises a radio frequency (RF) front end, an HFR network interface module and so on which were comprised in the conventional Base Station Transceiver System (BTS). The micro Base Station Controller (mBSC) 101 comprises a part corresponding to a digital module, a control part and so on so that the present invention can perform a centralized control management and a dynamic channel allocation. The mBSC 101 and the mBS 102 are connected through the HFR network 103. A forward link refers to a direction from the mBSC 101 to the mBS 102 and a reverse link does a direction from the mBS 102 to the mBSC 101. A signal to be transmitted through the HFR network 103 is the signal using a Subcarrier Multiplexing (SCM) scheme and a Wavelength Division Multiplexing (WDM) scheme. The mBSC 101 is connected with the conventional base station controller through a digital connection of E1/T1, HDSL and so on and a signal connection of an interprocessor communication. In the case that a high-level communication network becomes developed into other network, for example, the Asynchronous Transfer Mode (ATM) network 106, the present invention's mBSC 101 can be connected with the ATM network 106 by only changing the high-level communication network interface module of the mBSC 101. Although the high-level communication network becomes developed into an intelligent network and an ATM network, the HFR network 103 and the mBS 102 as well as the mBSC 101 may be applied to the intelligent network and the ATM network.

The synchronization between the mBSs 102 is adjusted through the GPS receiver 104 connected to the mBSC 101, and a reference clock signal is transmitted to the mBS 102 in order to adjust the synchronization between the mBSs 102.

In the future, the HFR network 103 connected with the HFR network node 107 through the optical fiber may be developed into a form of the public switched telephone network and utilized as an access network of various services such as the wireless/wire cable television and so on.

That is, the microcellular mobile communication system in accordance with the present invention may support efficiently the personal communications service (PCS) of the CDMA scheme, and may adapt superiorly to the development of the high-level communication network, and has a structure that it may support various radio communication services with a form of the HFR public switched telephone network in the future.

And, the present invention is not limited to the personal communications service.

Figure 2:
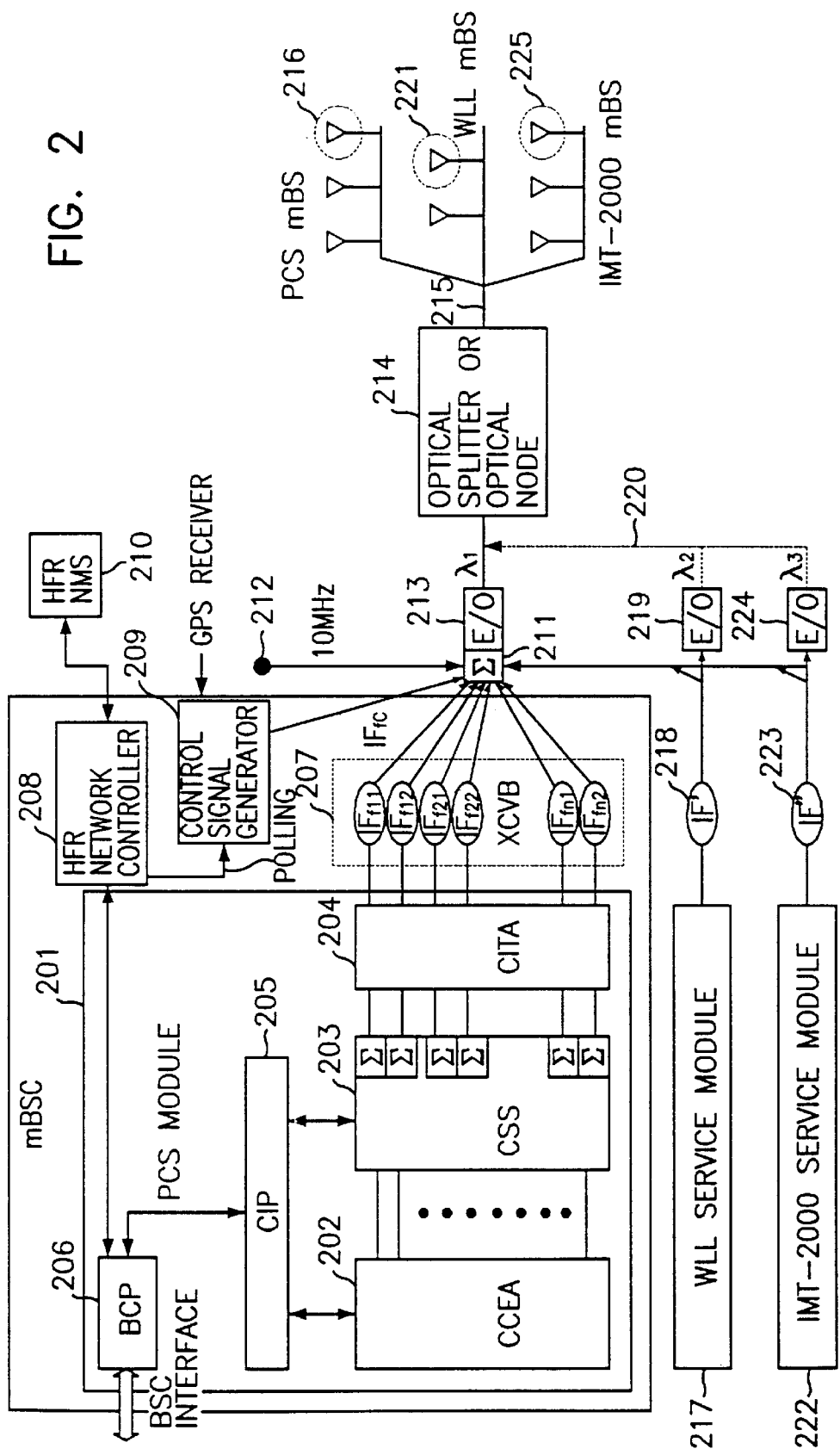
FIG. 2 shows a connection structure between an mBSC and an for explaining an operation of a forward link function according to the present invention.

FIG. 2 shows a connection structure between the mBSC and the mBS for explaining an operation of a forward link function according to the present invention.

The Personal Communications Service (PCS) module 201 within the mBSC performs a function corresponding to the digital unit of the conventional Base Station Transceiver System (BTS). The BTS Control Processor (BCP) 206, as the prior art, comprises a module for interfacing with the conventional base station controller. In addition, the BCP 206 controls the Channel Interface Processor (CIP) 205, and the CIP 205 controls the CDMA Channel Element Assembly (CCEA) 202 and the Code Stream Switch (CSS) 203.

In the present invention, the BCP 206 further includes a function for communication with the CIP 205 and a function for interfacing with the HFR network controller 208 in order to control the CSS 203. Also, the CIP 205 further includes the CSS controlling function for a dynamic resource management and a softer handover between cells.

The CCEA 202 as the prior art performs spread modulation/demodulation functions according to the CDMA scheme. In the present invention, each channel of the CCEA 202 outputs I, Q signals by α, β, γ sectors to the CSS 203.

The CSS 203 performs a function for mapping a three-sector structure to a plurality of microcells, as a structure proposed in the present invention, so that the dynamic channel allocation and the softer handover between cells can be made. The CSS 203 switches appropriately signals received from the CCEA 202 according to the control of the CIP 205 and then combines digital signals received by each of microcells. Such signals are up-converted into the CDMA IF 4.95 MHz through QPSK modulation in the CDMA IF Transmission Assembly (CITA) 204.

The Transceiver block (XCVB) 207 means a network interface module signal, and its function is to convert the output signal of each CITA 204 into a cable frequency by microcells.

The cable frequency combiner 211 combines the output signals of the XCVB 207, a forward control signal for the HFR network management such as the mBSs 216, 221 and 225 maintenance/management and so on, and a reference clock signal in the frequency domain. Such combined electrical signals are converted into the optical frequency $\lambda_1$ through the electrical-to-optical converter (E/O). That is, they are transmitted by the SCM scheme.

Referring to FIG. 2, the optical node or optical splitter 214 may be interfaced with HFC network. Where the reference numeral 214 refers to an optical splitter, the reference numeral 215 refers to a structure of star-shaped optical fiber network, and where the reference numeral 214 refers to optical node, the reference numeral 215 refers to a structure of coaxial network. Consequently, the micro base station 216 up-converts a message conveyed on the cable frequency transmitted from the XCVB 207, into the RF, and transmits the up-converted message to a mobile station.

The HFR network controller 208 controls the operation/management of HFR network including the mBS, the grouping/ungrouping of the mBSs, a power source, a plurality of Frequency Allocation (FA) transmissions, the RF change and so on, wherein the HFR network controller 208 controls each mBS by a polling scheme and transmits a forward control channel signal to each mBS, after generating it through the control signal generator 209.

On the other hand, the HFR network controller 208 is connected to a HFR network management system (NMS).

The GPS receiver 212, as the prior art, generates reference clock signals and timing information necessary to each module to maintain the system and network synchronization. In the present invention the reference clock signals are transmitted to each mBS through the cable frequency combiner 211, comprising the GPS receiver 212 to mBS, without installing the GPS receiver every mBS for synchronization between mBSs.

That is, the reference clock signals (for example, 10 MHz) generated from the GPS receiver 212 of mBSC, are transmitted to the mBS through the HFR network for the frequency coherence between mBSs.

The microcellular mobile communication system in the accordance with present invention as described above may be connected with the Wireless Local Loop (WLL) service module 217 for providing a WLL service, and the service module 222 for providing the third generation mobile communication service. That is, the WLL service module 217 up-converts the RF into the cable frequency appropriate to a service and then provides the channel frequency combiner 211 of the present invention with the signals converted by the additional IF converter 218, or converts electrical signals into optical signals using the additional electrical-to-optical converter 219, and then provides the optical splitter or optical node 214 with the converted signals through the optical wavelength coupler (not shown) included in the path 220. Similarly, the third generation mobile communication service module 222 up-converts the RF into the cable frequency appropriate to a service and then provides the channel frequency combiner 211 of the present invention with the signals converted by the additional IF converter 223, or provides the optical wavelength coupler of the path 220 with the RF through the additional electrical-to-optical converter 224. The optical splitter or optical node 214 is connected to the mBSs 221 and 225 for providing these services.

Here, where the demand of each service is great, a wavelength Division Multiplexing (WDM) scheme may be applicable to a service since a broad band spectrum is possible. The electrical-to-optical converters 219 and 224 have different wavelengths $\lambda_2$ and $\lambda_3$ from the electrical-to-optical converter 213 and the wavelengths $\lambda_2$ and $\lambda_3$ may be transmitted to each mBS through the optical wavelength coupler of the path 220.

The wavelengths $\lambda_2$ and $\lambda_3$ are selected in the mBSs 221 and 225, respectively as appropriate to the demand according to optical wavelength and then transmitted by the desired radio frequency band.

The present invention applies for each cell offset values of Pseudo Noise (PN) codes of different pilot channels, and then classifies each cell. For that, at the installation time the microcellular mobile communication system measures or calculates the transfer delay time of signal between the mBSC and the mBS, and applies a store and forward scheme in the mBSC depending upon this transfer delay time, so that the mBSC transmits a pilot message to the mBS while adjusting a timing to each mBS. This procedure is illustrated in FIGS. 3A and 3B in detail.

Figure 3A:
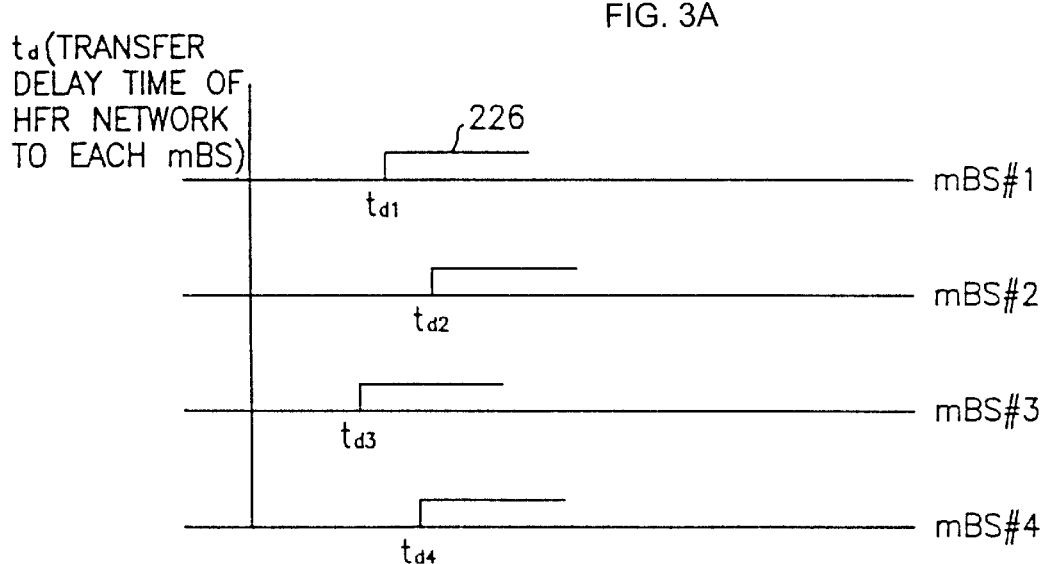
FIGS. 3A and 3B show an exemplary embodiment applying offset to pilot PN code according to the present invention.
Figure 3B:
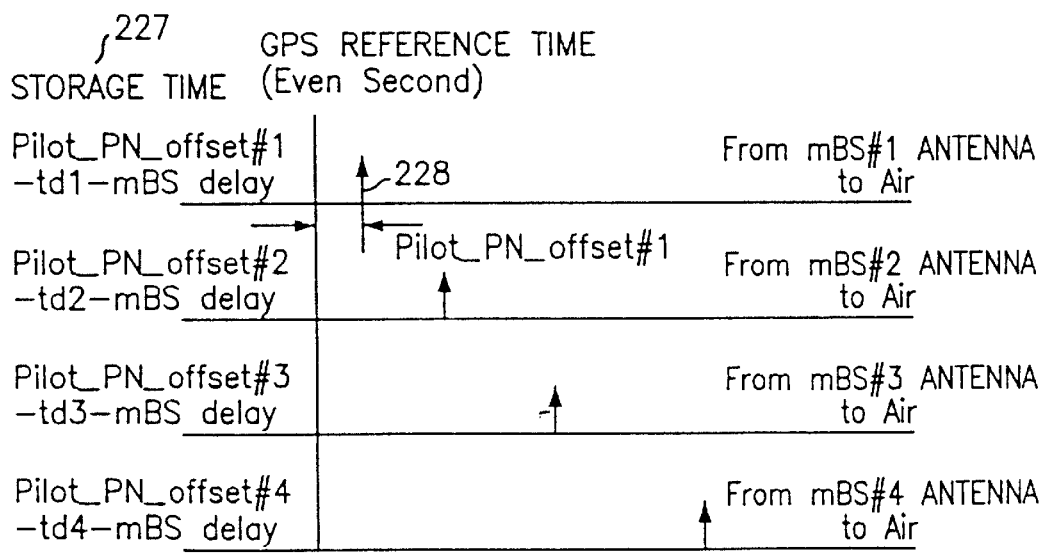

FIGS. 3A and 3B show an exemplary embodiment applying offset to pilot PN code according to the present invention.

An mBSC module applies an offset value to a delay time value taking the delay time from the mBSC to antennas of every mBS into account. That is, when the mBSC module measures the transfer delay time of HFR network to each mBS using an Optical Time Domain Reflectometer (OTDR) 226 as shown in FIGS. 3A, and finds the transfer delay time of the mBS itself to set a storage time on the basis of GPS time (even second) 227 (FIG. 3B), a message is transmitted from the antenna of each mBS according to pilot pseudo noise code (Point-PN) 228 (FIG. 3B). Such a timing adjustment may be implemented in the CCEA or the CITA within the mBSC.

Figure 4:
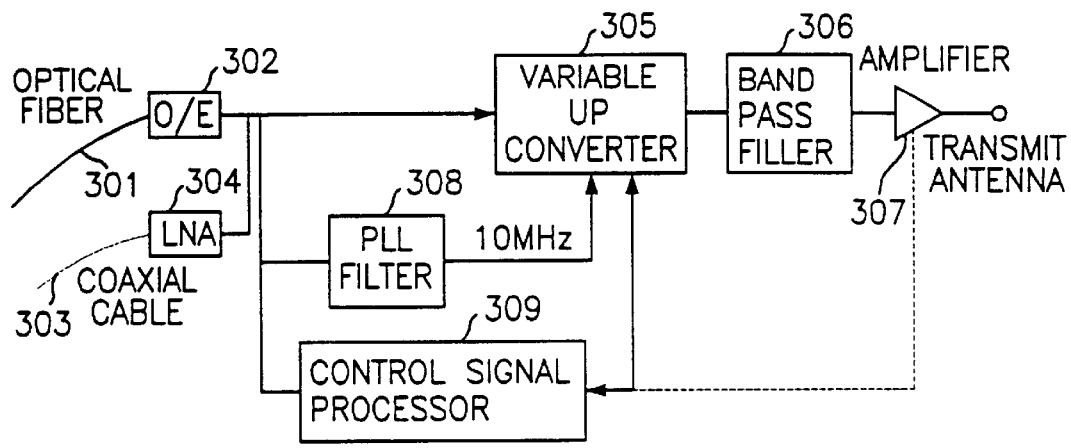
FIG. 4 is a block diagram of an mBS transmitter according to the present invention.

FIG. 4 is a block diagram of an mBS transmitter according to the present invention.

The optical signals transmitted through the optical fiber link 301 are converted into the electrical signals of cable frequency by the optical-to-electrical converter 302. The signals are converted into radio frequency band by the variable up-converter 305.

Reference clock signals (for example, 10 MHz) are provided to the variable up-converter 305 after being filtered by the Phase Locked Loop (PLL) filter 308 and used as reference frequency for up-converting electrical signals. This reference frequency assures the coherence between mBSs.

Forward control channel signals are decoded in the control signal processor 309 and used to perform the controlling, maintaining and managing of the mBS. The band pass filter 306 removes unnecessary spurious components and outer band components, and the power amplifier 307 is an amplifier for transmitting a proper power through an antenna. Here an automatic gain control (AGC) function is added to the power amplifier 307 to control the link gain of HFR network and a transmission output. Then, of course the power amplifier 307 receives the control commands of the control signal processor 309.

Where the reference numeral 214 in FIG. 2 refers to an optical node, and in other words where Hybrid Fiber Coaxial (HFC) network is used, the optical node 214 receives signals through the coaxial cable 303. Taking the extended distance of the optical node and the mBS into account, a line amplifier may be included in the coaxial cable 303.

Cable signals, transmitted from the optical node 214 to each mBS through the coaxial cable 303, are inputted to the Low Noise Amplifier (LNA) 304, and then the signals are processed in a scheme of using the optical fibers.

Where transmitting signals using the wavelength Division Multiplexing scheme, an optical wavelength coupler may be inserted between the optical fiber 301 and the optical-to-electrical converter 302, and extracts only the desired optical wavelength signals.

Figure 5A:
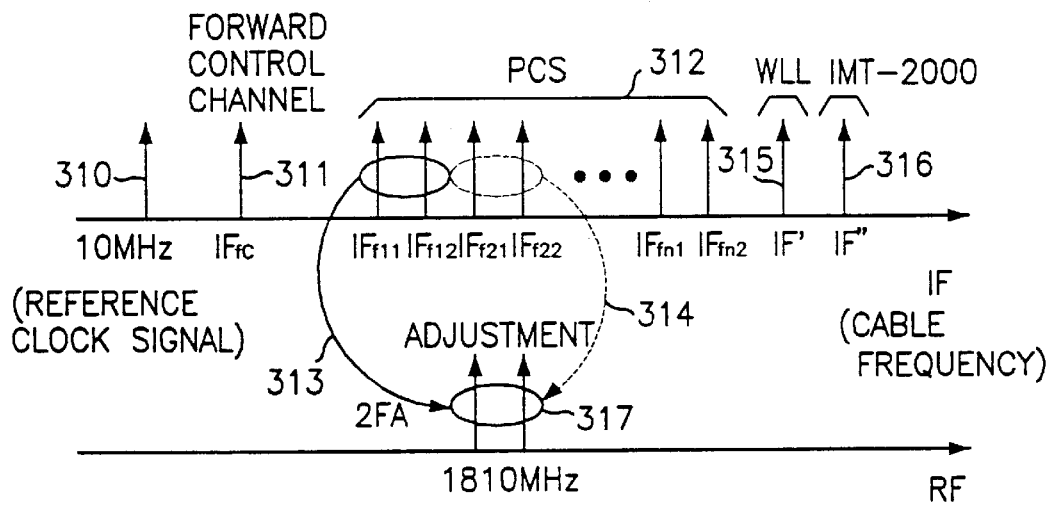
FIG. 5A shows a distribution of a forward cable frequency.

FIG. 5A shows a procedure of allocating forward cable frequency.

The reference numeral 310 is a reference clock signal of Continuous Wave (CW) for assuring the network coherence, and the reference numeral 311 refers to a signal carrying the forward control channel information, wherein the control channel information includes several parameters, the up-convecting range of cable frequency, the power control information and so on. The forward control channel is transferred on a polling scheme in the mBSC, and a data format includes mBS ID, command, data field, check sum and so on.

The reference numeral 312 represents a spectrum distribution of forward cable frequency for service, and the 2n number of signal spectrums where using 2FA as for the n number of microcells. $IF_{f11}$ and $IF_{f21}$ are transmitted on the radio frequency 317 like the cells Nos. 1 and 2, but have offset values of PN codes different from each other. $IF_{f11}$ and $IF_{f21}$ mean signals toward the same cell No. 1, and are transmitted on different radio frequencies (2FA of the reference numeral 317).

Any mBS performs the frequency up-converting as in the reference numeral 313 in order to form the microcell No. 1 and adjusts the frequency up-converting as in the reference numeral 314 in order to form the microcell No. 2. In the same way, the microcell No. n where n is a natural number may be formed. If necessary, each of mBSs may up-convert microcell frequencies for the same number, and at this time it is called "grouped". The way of grouping may improve the quality of service, and reduce greatly the facility investment in little traffic area by processing the dynamic resource allocation in cells.

The IF signals 315 and 316 may be additionally allocated for the WLL service and the third generation mobile communication service, and have extensity for various services such as Local Multipoint Distribution Services (LMDS) and so on. On the other hand, when transmitting signals on the WDM scheme, it is unnecessary for the frequencies 315 and 316 to be distinguished from the frequency 312.

Figure 5B:
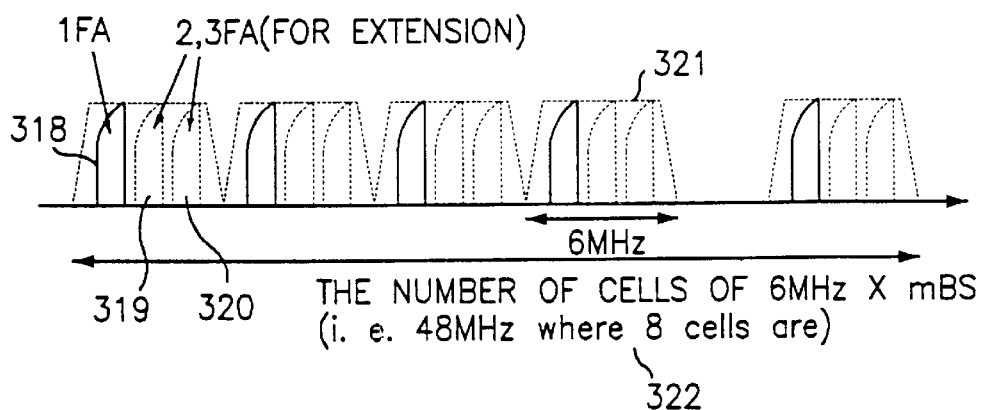
FIG. 5B shows an exemplary embodiment of a method of allocating a forward cable frequency.

FIG. 5B shows an exemplary embodiment of detailed allocation associated with the spectrum of forward cable frequency from FIG. 5A.

In FIG. 5B, the reference numeral 321 represents the allocation bandwidth, 6 MHz, of cable frequency spectrum per mBS, and the mBS may be extended up to 3FA. The reference numeral 318 refers to the cable frequency bandwidth (2 MHz) occupied when using 1FA (1.25 MHz), and the frequencies 319 and 320 are for 2FA and 3FA extensions. For example, when the number of microcells is eight, the spectrum distribution occupies 48 MHz as in the reference numeral 322.

Figure 6:
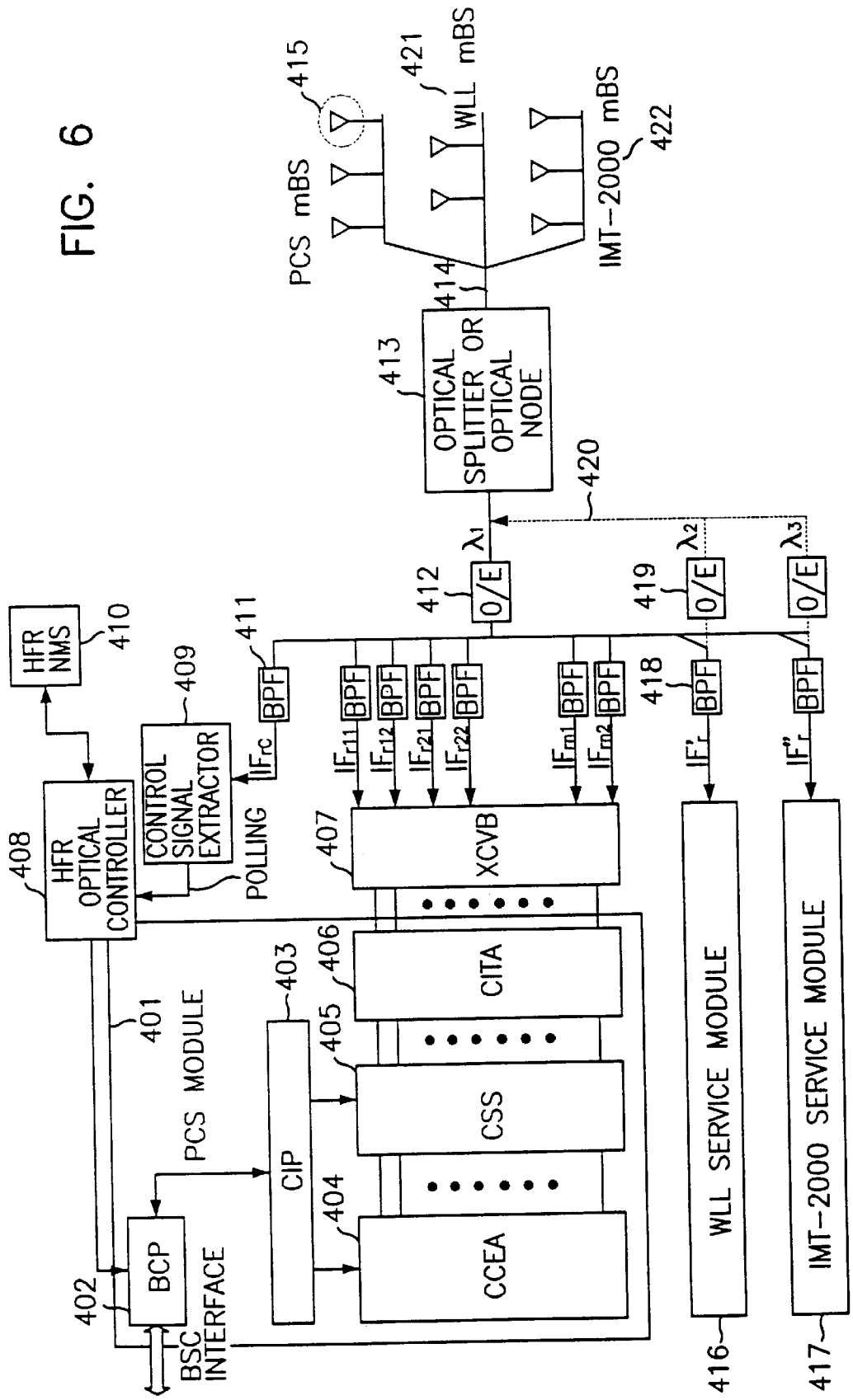
FIG. 6 shows a connection structure between an mBSC and an mBS for explaining an operation of a reverse link function according to the present invention.

FIG. 6 shows a connection structure between an mBS controller and an mBS for explaining the operation of a reverse link function according to the present invention.

A PCS receive module 401 within the mBSC receives the PCS signals transmitted through the HFR network, and functionally performs the receive function of the conventional digital unit. The BTS control Processor (BCP) 402, as shown in FIG. 2, is coupled to the conventional Base Station Controller (BSC) using the BSC and the inter processor communication, The BCP 402 controls the MBSC and an interface with the conventional BSC. The BCP 402 in the present invention is connected with the CIP 403 to control the Code Stream Switch (CSS) 405 and with the HFR network controller 408 to maintain and to manage the HFR network of reverse link. The HFR Network Management System (NMS) 410 is an outside monitoring terminal that has the function of Graphic User Interface such as command input and so on to an operator terminal.

The mBS 415 receives RF signals from personal station, down-converts the signals into the allocated cable frequencies, and then transmits them to the PCS receive module 401 of the mBSC through the link 414 of HFR network interface module.

The link 414, which connects the mBS with the optical splitter or optical node 413, may be an optical fiber or a coaxial cable. In the reverse link, the optical splitter is a passive device and has the function of coupling optical signals, so that it combines the optical signals transmitted from each mBS and transmits the combined signals to the mBSC.

Where the link 414 is a coaxial cable, the optical node 413 comprises a cable frequency combiner, an electrical-to-optical conversion module and so on, and it may comprise an amplifier incorporating an equalizer when taking the coaxial cable characteristic into account.

Signals, transmitted from each mBS, are converted into electrical signals by the optical-to-electrical conversion module 412 of the mBSC, the converted signals are filtered by the band pass filter 411 and inputted to the Frequency Conversion Board (XCVB) 407 in order to separate the cable frequency band allocated to each microcell.

The XCVB 407 down-converts signals and makes the signals into IF 4.95 MHz signal for CDMA. And the XCVB 407 measures the Received Signal Strength Indicator (RSSI) and controls a reverse link gain. Output signals of the XCVB 407 are inputted to the CDMA IF Receiving Assembly (CIRA) 406. The CIRA 406 up-converts CDMA IF (4.95 MHz) signal into I (Inphase) and Q (Quadrature) channel components through QPSK demodulation, performs a digital sampling of analog signals and transmits them to the CSS 405.

The CSS 405 of the reverse link connects signal transferred from each microcell to appropriate channel devices by the control of the CIP 403 and its detailed block diagram is shown in FIG. 9.

Received signals inputted from each microcell are despread, deinterleaved and decoded in the CCEA 404 of the reverse link and then packetized through the BCP 402 to be transferred to BSC.

The control signal extractor 409 extracts polling respond control signals of each mBS through the BPF 411 and then transfers the extracted signals to the HFR network controlling system 410. Such a content is indicated on the HFR network controller 408, if necessary. The received control signals contain error message, command implementation results, status monitoring results of each mBS and mBS ID for identifying each mBS.

Each mBS in the reverse link should have an electrical-to-optical converter including an LED and a different physical link from a forward link in consideration of a laser diode or a bandwidth having an optical wavelength spaced by the predetermined interval so as to reduce the beat noise of an optical signal. Where the optical frequencies of the electrical-to-optical converter 213 in the FIG. 2 and the electrical-to-optical converter 507 in the FIG. 7 are set differently from each other, one optical fiber link may be shared in accordance to the wavelength division multiplexing scheme between the forward and reverse links.

Where both the reference numeral 214 in FIG. 2 and the reference numeral 413 in FIG. 6 are optical nodes, the relation between the MBSC and the optical node, may be applicable to the concept as described above. In other words the optical node and the mBS may be connected with different or same coaxial cables. Here where the same coaxial cables are used, the cable frequency shall be allocated differently from each other in the forward and reverse. In particular, each mBS may take remotely the power supply through coaxial cables connected to the optical node.

The invention may operate the WLL service receive module 416 and the third generation mobile communication service receive module 417 within different or same mBSCs. In other words, there are the WLL service receive module 416, the third mobile communication service receive module 417 or other service modules. Where the SCM transmission capacity of HFR network is sufficient, signals transmitted from the corresponding base stations 421 and 422, may be transferred to the WLL service receive module 416 and the third generation mobile communication service receive module 417. Using the wavelength Division Multiplexing scheme, the signals may be transferred through the optical-to-electrical converter 419 and the path 420. Here the optical-to-electrical converter 419 receives optical wavelength different from the optical-to-electrical converter 412, and the path 420 includes an optical wavelength coupler (not shown) extracting only a desired wavelength of optical signal.

Figure 7:
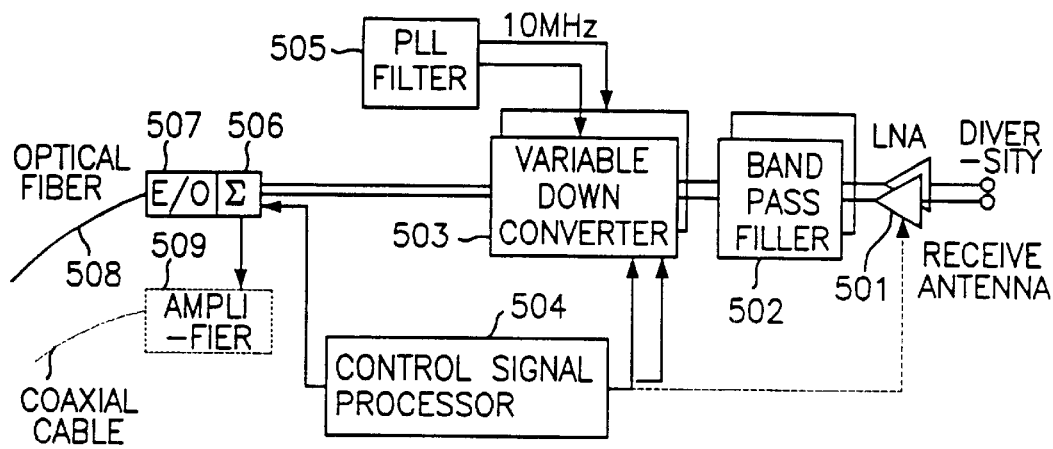
FIG. 7 is a block diagram of an mBS receiver according to the present invention.

FIG. 7 is a block diagram of an mBS receiver according to the present invention.

Signals from the mobile station are transferred to the mBS receiver through the diversity antenna and the main receive antenna of the mBS. To assure the signal quality on the fading environment, the two signals from the diversity antenna and the main receive antenna are inputted into the cable frequency combiner 506 of HFR network interface module together with reverse control channel signals generated in the control signal processor 504 via two LNAs 501 different, two band pass filters 502, and two variable down-converters 503, which are respectively different from each other.

Signals combined in the cable frequency domain, respectively, are transmitted to optical fibers or coaxial cables through the electrical-to-optical converter 507 or the amplifier 509.

The variable down-converter 503 down-converts the radio frequency into the cable frequency using the reference clock signal outputted from the PLL filter 505. The control signal processor 504 specifies the down-converting range of the control signal processor 504.

Also, the mBS comprises a power supply module, surge arrester, antenna and so on. In Particular, a duplexer is added to the mBS so as to share a transmit/receive antenna.

Figure 8A:
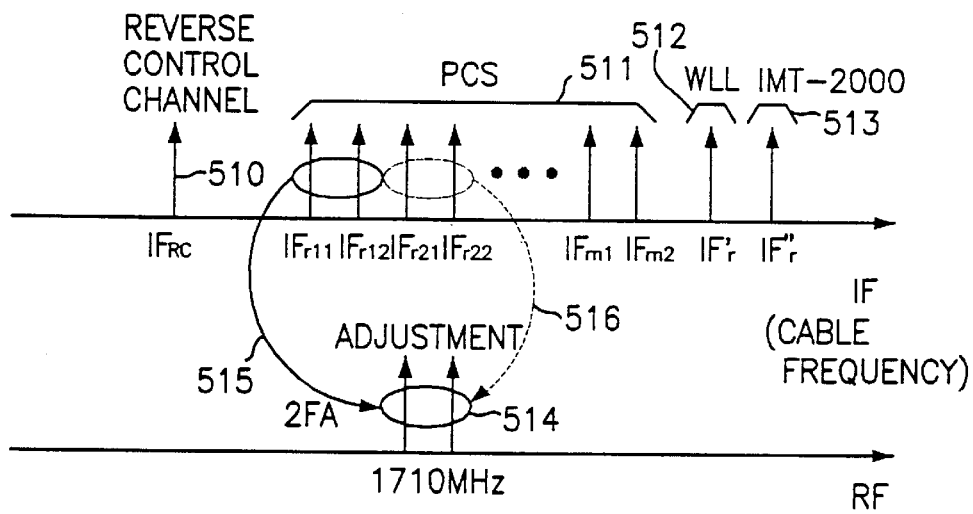
FIG. 8A shows a distribution of a reverse cable frequency.

FIG. 8A shows the distribution of a reverse cable frequency.

The reference numeral 510 refers to a reverse control channel containing mBS status, power control, module status information and so on. The band of the cable frequency 511 represents a band allocated for PCS, and as for 2FA capacity per each cell when forming the n number of microcells where n is a natural number.

$IF_{r11}$ and $IF_{r12}$ are the cable frequencies in the case that FAs different from each other are applied to the cell No. 1. $IF_{r11}$ and $IF_{r12}$ are the cable frequencies that use the same FA and offset values of pilot PN codes different from each other for the cell No. 1 and the cell No. 2. The variable down-converter 503 in FIG. 7 can down-convert the filtered RF 514 of receive band into the cable frequencies 515 and 516 for any microcell so that the single operating and the grouping of the mBSs can be accomplished. The reference numeral 512 and 513 respectively, represent the cable frequency distribution of the SCM scheme for the WLL service and the third generation mobile communication service. In the optical wavelength division multiplexing scheme, the cable frequency like PCS may be employed.

Figure 8B:
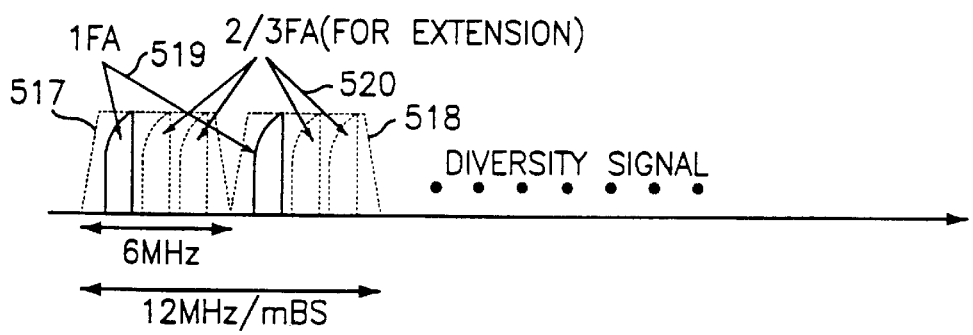
FIG. 8B shows an exemplary embodiment of a method of allocating a reverse cable frequency.

FIG. 8B shows an exemplary embodiment of a method of allocating a reverse cable frequency more detailedly than FIG. 8A.

Particularly, the FIG. 8B represents the case that a receive antenna diversity is applied to. The reference numeral 516 and 517 respectively represent received signals through the main receive antenna and the diversity antenna. The reference numeral 519 represents the cable frequency of 2 MHz band allocated to transmit the 1.25 MHz CDMA band signal to the mBSC at 1FA. In order to extend to 2/3FA, the cable frequency is allocated such as the frequency 520. After all, where the antenna diversity is applied, the 12 MHz cable frequency bandwidth is assigned to each microcell. The more the number of microcells increases, the more the required cable frequency bandwidth increases.

FIG. 9 is a block diagram of mBSC according to an exemplary embodiment of the present invention and represents the traffic signal flow except for the mBS control signal and the clock/frequency synchronous signal path.

The base station of the conventional scheme has a 3-sector structure, so it is difficult for the base station responsible for at most, three cells to extend to the microcell system.

The characteristic of mBSC structure for overcoming the problem is that the softer handover is possible between a plurality of cells and the dynamic channel allocation is possible by applying the CCS 603.

One CDMA Channel Element Assembly (CCEA) 601 comprises the two Channel Element Modules 602, and each channel element module comprises 16 channel elements.

The number of such a CCEA may be extended up to the M (M is a natural number), and in this case the number of channel elements becomes M×32. In the forward link, each channel element receives decoded voice data and control information from the BSC, and outputs I and Q signals for each of α, β and γ sectors to the corresponding switching module (SM) 604 of the CCS 603.

These kinds of signals for channels are as shown in the reference numeral 610.

The switching module 604 switches signals transferred from the channel element module 602 to the given destination cells in accordance with the control of the Channel Interface Processor (CIP) 609.

I and Q signals toward each destination cell are combined first through the 32×1 digital combiners 605. The 2N number of the 32×1 digital combiners 605 per one CDMA channel assembly 601 for the N number of cells are required.

The first digital-combined I and Q signals, are combined in each of the M×1 digital combiners 606 secondly. Output I and Q signals of the second combined M×1 digital combiners 607 are inputted to the CDMA IF Transmission Assembly (CITA) 607 transmitting CDMA IF signals. The CDMA IF Transmission Assembly 607 converts the digital signals into the analog signals, combines and up-converts them into IF signals through QPSK modulation. The CDMA IF signals for each of destination cells are inputted into the XCVB 407, HFR network interface module.

In the case of the reverse link, main signals by cells and diversity signals for each cell which are inputted into the CDMA IF Receive Assembly (CIRA) 608 through the XCVB 407, HFR network interface module, are down-converted into baseband I and Q signals.

Main signals and diversity signals are converted into digital signals, and multiplexed, and then inputted into the CSS 603. The signals are inputted into every switching module 604.

The Channel Interface Processor (CIP) 609 communicates with the BCP and the BSC in order to connect with the required channel elements and the signals, and then controls the switching module 604. These kinds of detailed signals of the reverse link are shown as in the reference numeral 610. According to the demand, each channel element can transmit and receive data, so that the channel element modules 602 and the switching module 604 provide the bidirectional communication path.

The mBSC according to the present invention may support a plurality of cells needed for the microcell system, and have the structure of the CSS for conversion between a 3-sector and the N number of cells. Particularly, by utilizing the code stream switch, the dynamic resource management between microcells is possible and the softer handover may be extended up to the N number of cells.

Figure 10:
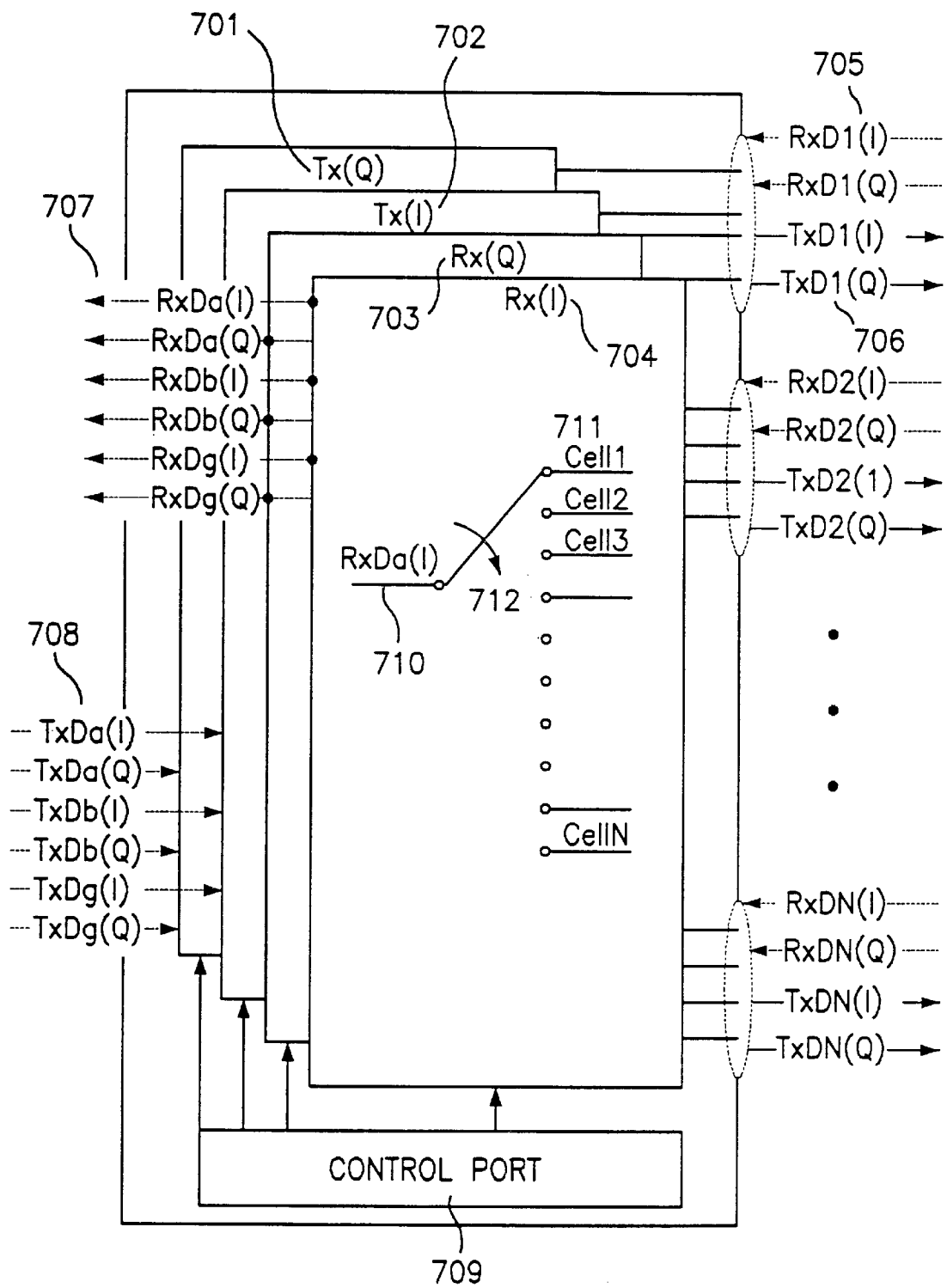
FIG. 10 shows a detailed construction of a switching module within a code stream switch according to the present invention.

FIG. 10 shows a construction of a switching module within a code stream switch according to the present invention.

A switching module (SM) is an important module of a Code Stream Switch (CSS) within the mBSC. The SM enables the efficient dynamic resource management and the softer handover between cells on the environment of microcells.

The dynamic resource management is a function which may allocate a specific channel element to one of a number of cells if necessary and which is necessary surely since the traffic density is ununiform in accordance with the time and space of microcell environment.

When the mobile station moves to another cell during conversation, the softer handover is the function that may assure the movement between mobile station cells without conversation cutoff. In the general case, the mobile station may pass the overlapping area of three cells at most, among the N number of cells and therefore each channel element shall transmit and receive signals to three cells needed for the mobile station. To support such a function, the switching module within the CSS has a line switch structure that is composed of Single Pole Multi Throw (SPMT) switch matrix.

All the transmit (Tx) and receive (Rx) signals are divided into I and Q signals, and processed. So four 3×N switches are required for the N cells. That is, two 3×N switches 701 and 702 are required for two Tx signals and others 703 and 704 are required for two Rx signals. In the figure, the reference numeral 705 and 706 represent the received and transmitted signals from and to the side of the cell No.1. Here the signals exist respectively for each of cells.

In the figure, the reference numeral 707 represents I and Q received signals of each of three cells corresponding to each of α, β and γ sectors needed for communicating between a specific channel element and a mobile station. The control port 709 controls the selection and connection of three cells among the N number of cells.

For example, if the received signal 711 from the cell No.1 is connected to the received data 710 by the switch 712, a specific channel element connected with the received data 710 may perform a function for receiving the specific channel of the cell No.1 signal. Because each channel element and cell may be connected variably through a switching module, a channel may be allocated dynamically to a specific cell for which traffic is needed.

An exemplary embodiment of softer handover may be explained as follows. The same concept is applied to both forward and reverse paths, so now only the reverse softer handover will be described.

When a mobile station is busy in the cell No.2, the channel element connected with the received data 707 processes the traffic channel of the mobile station. Then, the received data (RxDa) 707 is connected with the cell No.2.

When the mobile station moves from the cell No.2 to the cell No.3, the handover occurs in the overlapping area. Then, the received data (RxDa) 707 is connected to the cell No.2 and the received data (RxDb) 707 is connected to the cell No.3.

If the mobile station has moved completely into the cell No.3, the received data (RxDa) is connected to the cell No.3. Therefore, the softer handover is implemented. The softer handover means that the handover is processed without cutoff of the connection between a channel element and a mobile station. When the mobile station moves to another cell, the softer handover is processed in the same way.

As described above, the present invention has the following effects.

1) The present invention may increase the subscriber capacity, provide the high reliable service, extend the battery life of a personal station by inducing low power communication and assure the radio channel capacity so that the radio multimedia service can be accomplished in the future, by maximizing the utility efficiency of radio frequency resource through cell miniaturization.

2) As a base station equipment is minimized, the present invention may reduce time and cost required to install a large number of base stations under picocell or microcell environment of a cell radius of several decades to several hundred meters by applying HFR technique and separating CDMA digital hardware and radio frequency transceiver unit. In addition, since the base station equipment is small, additional base station selection is unnecessary, and the base station installation may be facilitated in the metropolitan radio environment. And the present invention may reduce the power consumption of micro base station equipment and improve reliability of the base station.

3) The present invention may transmit a number of carriers through one transmission link by applying the SCM and WDM transmission techniques.

4) The present invention may distribute efficiently resources through the dynamic resource management under a complicated metropolitan environment of which traffic density is quite different from each other in accordance with areas and times.

5) The system according to present invention may be installed efficiently to an indoor, a building underground, an underground tunnel as well as an outdoor, and may compose the single cell also in the indoor, and can convert readily to the structure of a separated antenna of single cell.

6) The installation of new base station channel element is made on the center, so that extension of system capacity may be easily implemented, support a high-speed data service including voice service by the wideband of micro base station and reduce the cost of maintenance and initial facility investment.

7) The present invention may change only the interface module of micro base station controller, thus accommodating the development of high-level communication network without changing each base station equipment. And the present invention adds a necessary application service module and provides services through the same HFR network that may be provided as a type of PSTN in the future.

8) The present invention can provide the reliable service through the centralized management since the required error reporting and the simple control can be made.

9) The present invention may reduce the cost of initial facility investment by establishing HFR network using the conventional CATV cable network without installing additionally optical cables to main node. The HFR network as well as the optical node or optical splitter may be implemented through the optical cable network establishment or the coaxial cable network of conventional HFC.

10) The present invention may support more than three microcells.

11) The present invention processes the handover between microcells as in the softer handover between the conventional sectors, and may improve the speech quality.

12) The present invention may be converted to the microcell system in the subscriber area of high density without changing a high-level network of a base station controller by having compatibility with the conventional BCP.

13) The present invention applies the synchronous scheme between micro base stations and so provides the reliable service. In particular, synchronization may be obtained by the store & forward scheme and transmission of the reference clock signal without installation of GPS to each micro base station.

14) Each micro base station may do grouping and ungrouping depending upon necessity, so the present invention may perform the grouping of service initially and operates like macrocell, distribute the limited resource according to the traffic distribution and operate with the same infra when the demand increases.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A micro cellular system for use in a wireless communication system based on a Code Division Multiple Access (CDMA) technology, comprising:

a micro base station controller (mBSC) ,connected to abase station controller(BSC), for receiving forward link traffic signals from the BSC, performing a spread modulation with respect to the forward link traffic signals, supporting an inter-cell handoff, combining the spread modulated signals, converting the combined signals into analog signals by using a digital modulation scheme and converting the analog signals into forward link hybrid fiber-radio(HFR) cable frequency signals in a forward link, and for receiving reverse link HFR cable frequency signals, extracting carrier signals bearing reverse link traffic signals from the reverse link HFR cable frequency signals, frequency down converting the carrier signals, converting the frequency down converted signals into reverse link digital signals by using a digital demodulation scheme, performing a spread demodulation with respect to the reverse link digital signals to thereby produce reverse link traffic signals and transmitting the reverse link traffic signals to the BSC in a reverse link;

a plurality of micro base stations, each connected to the mBSC and whole or part of the plurality of the micro base stations being included in a same micro cell, for transferring the HFR cable frequency signals including the forward link and the reverse link HFR cable frequency signals and transmitting/receiving RF (Radio Frequency) signals to/from a multiplicity of mobile stations, wherein each micro base station has one among a laser diode whose optical wavelengths are separated from each other and a light emitting diode; and a HFR network, connecting the MBSC to the plurality of micro base stations, for converting the forward link HFR cable frequency signals into forward link optical signals, outputting the forward link optical signals via a single optical fiber core connected thereto and distributing the forward link optical signals to each micro base station in the forward link, for combining reverse link optical signals received from each micro base station, the combined reverse link optical signals being transferred via the single fiber core, converting the reverse link optical signals into electrical signals to thereby produce reverse link HFR cable frequency signals and transferring the reverse link HFR cable frequency signals to the mBSC, wherein the micro cell is distinguished from other micro cells by its forward link and reverse link HFR cable frequency bands and the number of the frequency bands of each of the forward link and the reverse link HFR cable frequency signals ranges from one to the number of the plurality of the micro base stations.

2. The microcellular system of claim 1, wherein the mBSC includes:

a HFR network controller for generating forward link control channel signals, transmitting the forward link control channel signals to each micro base station, extracting reverse link control channel signals received from each micro base station, performing operation and management of each micro base station and interworking with HFR NMS (Network Management System) based on a GUI (Graphic User Interface), wherein the operation and management is performed by using a polling scheme.

3. The microcellular system of claim 1 or 2, wherein the HFR network includes:
- a frequency combiner for combining the HFR cable frequency signals from each micro base station and the forward link control channel signals from the HFR network controller;
- a first E/O (Electrical to Optical) converter for converting output signals from the frequency combiner into the forward link optical signals;
- a first O/E (Optical to Electrical) converter for separating the reverse link optical signals from the forward link optical signals by using optical coupling and converting the reverse link optical signals into electrical equivalents;
- an optical signal distributing/combining means, connected to the single fiber core by way of at least one optical coupling for bidirectional communication, for distributing the forward link optical signals to each mBSC and combining the reverse link optical signals received from each micro base station via the single fiber core; and
- a frequency divider for dividing the output signals from the first O/E converter into a plurality of reverse link HFR cable frequency signals and the reverse link control channel signals, and bandpass filtering the re-verse link HPR cable frequency signals to thereby extracting one or more micro cell designation signals, each designating a micro cell.

4. The microcellular system of claim 3, wherein the optical signal distributing/combining means supports one or both of a passive star network employing no active elements and a HFC (Hybrid Fiber-Coaxial) network employing an optical node to connect the single fiber core to a coaxial cable network.

5. The microcellular system of claim 4, wherein the HFC network has a forward link O/E converter and a reverse link E/O converter in the optical node, wherein each of the forward link O/E converter and a reverse link E/O converter is connected to the corresponding micro base station via one coaxial cable, and a forward link low noise amplifier and a reverse link line amplifier are engaged in the connection.

6. The micro cellular system of claim 3, wherein the optical signal distributing/combining means, in case that it supports both of the WLL service and the IMT-2000 service, combines signals for each service by using a wavelength coupler so that the optical wavelengths are different for each service.

7. The microcellular system of claim 1, further comprising
- a Global Positioning System(GPS) receiver for receiving GPS signals and generating timing information and reference clock signals for use in synchronizing the system,
- wherein the mBSC evaluates propagation delay time of signals therefrom to antennas connected to the micro base stations, and each micro cell is distinguished by applying a distinct pilot pseudo noise (PN) code offset to each micro cell in consideration for the propagation delay time including a delay time of each micro base station itself.

8. The microcellular system of claim 1, wherein said each mBSC includes:
- a local controller for controlling a softer handover between each micro cell, performing a centralized dynamic resources management and controlling operation and management of the mBSC;
- a channel switch, under the control of the local controller, for performing switching, combining and dividing to convert a three sector structure into N micro cells, producing the combined signals by switching and combining the spread modulated signals, converting the combined signals into analog signals by using the digital modulation scheme, converting the analog signals into the forward link HFR cable frequency signals and outputting the forward link HFR cable frequency signals to the HFR network in the forward link, for dividing, switching and spread demodulating the reverse link digital signals converted by the digital demodulation scheme, and extracting reverse link HFR cable frequency signals corresponding to each micro cell.

9. The micro cellular system of claim 26, where in the HFR cable frequency signals include:
- forward link control channel signals and reverse link control channel signals, each for use in monitoring status of each micro base station and adjusting variables by using ID numbers incorporated therein;
- forward link and reverse link HFR cable frequency signals for transferring the carrier signals between the mBSC and the plurality of micro base stations, wherein each of the forward link and the reverse link HFR cable frequency signals has therein the RF signals or IF(Intermediate Frequency) signals.

10. The microcellular system of claim 9, wherein the forward link HFR cable frequency signals further include CW (Continuous Wave) reference frequency signals for frequency coherence of the HFR network and the micro base stations.

11. The microcellular system of claim 10, wherein each micro base station has:
- a transmitter for transmitting forward link RF signals to the mobile stations, each mobile station being air-coupled to the micro base stations; and
- a receiver for receiving reverse link RF signals from each mobile station;
- a reference frequency signal generator for receiving the CW reference frequency signals, receiving the reference frequency signals from the transmitter and reproducing the reference frequency signals;
- a forward link RF signal processor, under the control of the micro base station, for receiving the output from the reference frequency signal generator and selecting frequency bands of the forward link HFR cable frequency; and
- a reverse link RF signal processor, under the control of the micro base station, for receiving the output from the reference frequency signal generator and selecting frequency bands of the reverse link HFR cable frequency.

12. The microcellular system of claim 9, wherein the HFR cable frequency signals include any one of service carrier signals among WLL (Wireless Local Loop) service carrier signals and IMT-2000 (International Mobile Telecommunications-2000) service carrier signals.

13. The microcellular system of claim 9, wherein the forward link and the reverse link HFR cable frequency signals have transmission bandwidth wider than or equal to the bandwidth of the RF signals.

14. The microcellular system of claim 1, wherein each micro base station includes:
- a transmitter for transmitting forward link RF signals to the mobile stations, each mobile station being air-coupled to micro base stations; and a receiver for receiving reverse link RF signals from each mobile station;

wherein the transmitter has:
- a second O/E converter for converting the forward link optical signals transmitted from them BSC via the HFR network into the electrical equivalents;
- a first signal distributor for dividing the electrical signals converted at the second O/E converter;
- a transmitter base station control processor for extracting the forward link control channel signals from the output from the first signal distributor and monitoring the status of or controlling the micro base station in response to the forward link control channel signals;
- a forward link RF signal processor for selecting a designated forward link HFR cable frequency signal band indicated by the transmitter base station control processor, converting the selected band into the forward link RF signals and bandpass filtering the selected band into the forward link RF signals; and
- a high power amplifier for amplifying the output from the forward link RF signal processor to an appropriate level to transmit by way of antenna; and the receiver has:
- a low noise amplifier for amplifying signals from the antenna of the micro base station while suppressing noise therein;
- a reverse link RF processor for bandpass filtering the output from the low noise amplifier and converting the filtered output into the designated reverse link HFR cable frequency signal band;
- receiver micro base station control processor for generating the reverse link control channel signal containing information on the status and control of the micro base station;
- a first signal combiner for combining the output from the reverse link RF signal processor and the reverse link control channel signals; and
- a second E/O converter for E/O converting the output from the first signal combiner, wherein the second E/O converter has therein as its light source one of a light emitting diode and a laser diode, wherein the laser diode having a plurality of wavelengths, each wavelength corresponding to each micro base station.

15. The microcellular system of claim 14, wherein the micro base station uses a diversity receiving path in an additional band distinct from the reverse link HFR cable frequency band to thereby support a receiver antenna diversity function.

16. The microcellular system of claim 1, wherein a part of the plurality of micro base stations are grouped together such that the micro base stations belonging to the part select signals having the same HFR cable frequency signal band, and the grouping is adjustable by an operator.

17. A HFR interface architecture for use in a CDMA-based wireless communication system, transferring signals between a BTS (Base Station Transceiver Subsystem) and a plurality of micro base stations, each micro base station being connected to the BTS and air coupled with a plurality of mobile terminals, wherein forward link electrical signals are transferred from the BTS to the plurality of micro base stations after being converted into forward link optical signals and reverse link electrical signals from each micro base station are collectively transferred to the BTS after being converted into reverse link optical signals therein, each of the signals being used in defining micro cells and/or sectors, the architecture comprising:
- a BTS adapter, in a forward link, for receiving output from the BTS, converting the output into forward link HFR cable frequency signals and converting the forward link HFR cable frequency signals into the forward link optical signals, and in a reverse link, for receiving the reverse link optical signals including the reverser link cable frequency signals from the plurality of micro base stations, converting the reverse link optical signals into reverse link HFR cable frequency signals and providing the reverse link HFR cable frequency signals as input signals to the BTS, wherein the number of the forward link and the reverse link HFR cable frequency bands ranges from one to the number of the plurality of the micro base stations;
- a plurality of micro base station interface units, each having one among a laser diode whose optical wavelengths are separated from each other and a light emitting diode, for converting the forward link optical signals received from the BTS adapter into the forward link electrical signals in the forward link and for converting the reverse link electrical signals received from the plurality of micro base stations into the reverse link optical signals; and
- a cable means for transfers the forward link and the reverse link optical signals between the BTS adapter and the plurality of micro base station interface units via a single fiber core and including therein more than one optical couplers connecting more than one micro base stations.

18. The HFR interface architecture of claim 17, wherein signals transferred between the BTS and the BTS adapter are RF signals, frequencies of the RF signals is the same as the frequencies of the RF signals used in communicating between the micro base stations and the mobile stations, and the frequencies of the HFR cable frequency signals transferred between the BTS adapter and the micro base station interfacing units has frequency bands are one of the RF signals and IF signals.

19. The HFR interface architecture of claim 17, wherein the forward link HFR cable frequency signals include carrier signals carrying traffic signals and forward link control channel signals; and the reverse link HFR cable frequency signals include primary signals and the reverse link control channel signals, wherein the carrier signals have the bandwidth wider than or equal to the bandwidth of the RF signals.

20. The HFR interface architecture of claim 19, wherein the forward link HFR cable frequency signals further include reference frequency signals for frequency coherence of the HFR network and the micro base stations.

21. The HFR interface architecture of claim 19, wherein the reverse link HFR cable frequency signals further include diversity signals in an additional band distinct from the reverse link HFR cable frequency band to thereby support a receiver antenna diversity function.

* * * * *